(No Model.)
A. PFANNKUCHE.
MACHINE FOR MAKING CARBONS FOR ELECTRIC LAMPS.
No. 345,539. Patented July 13, 1886.
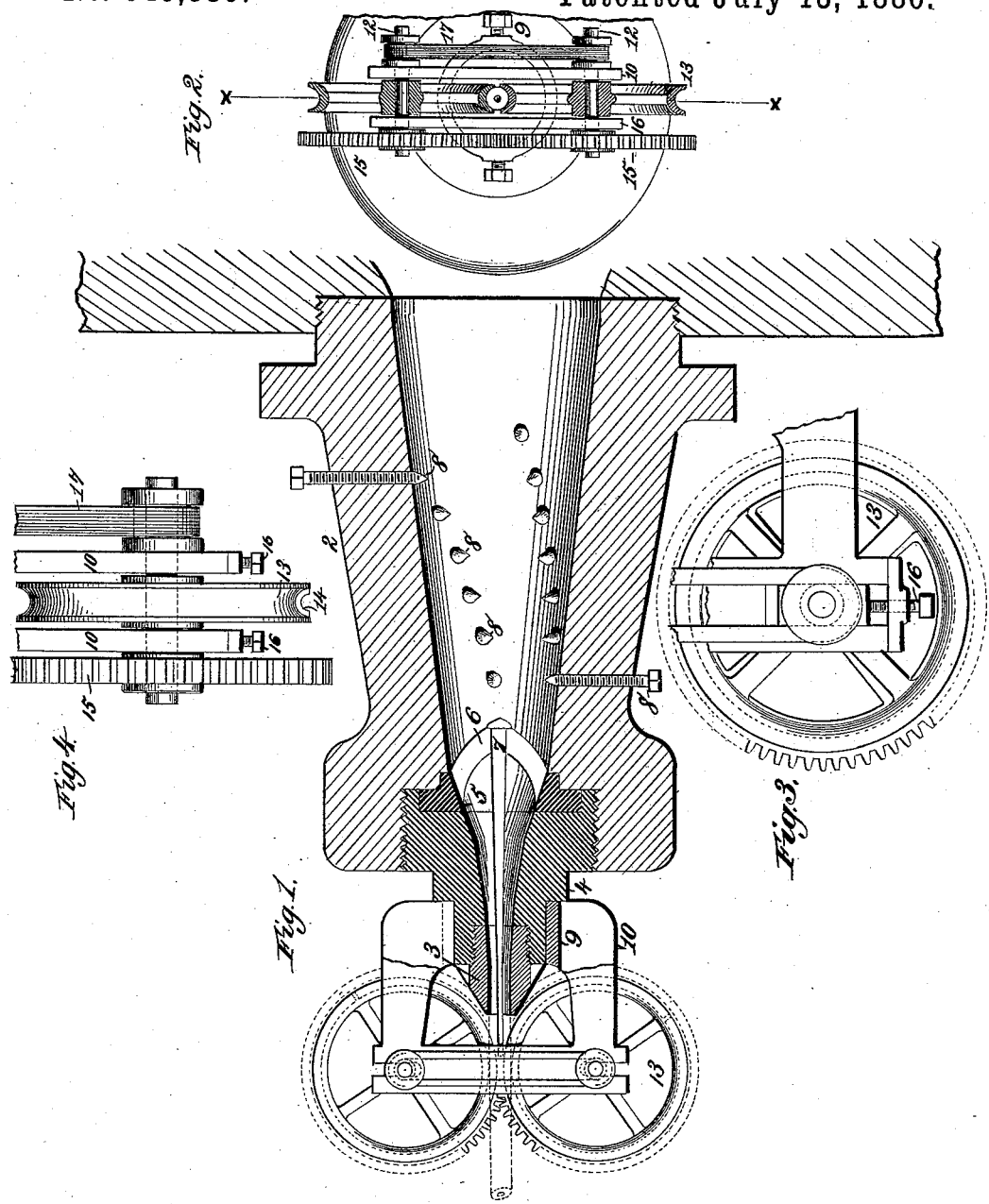
Witnesses.
Inventor.
Alfred Pfannkuche.
By James L. Norris.
Atty.

UNITED STATES PATENT OFFICE.

ALFRED PFANNKUCHE, OF NEW YORK, N. Y., ASSIGNOR TO THE FOREST CITY CARBON MANUFACTURING COMPANY, OF CLEVELAND, OHIO.

MACHINE FOR MAKING CARBONS FOR ELECTRIC LAMPS.

SPECIFICATION forming part of Letters Patent No. 345,539, dated July 13, 1886.

Application filed March 19, 1886. Serial No. 195,839. (No model.)

*To all whom it may concern:*

Be it known that I, ALFRED PFANNKUCHE, a citizen of Austria-Hungary, residing at New York, in the county of New York and State of New York, have invented new and useful Improvements in Machines for Making Electric-Light Carbons, of which the following is a specification.

My invention relates to an improved machine for making electric-light carbons and for analogous purposes; and the invention consists in a novel construction and combination of parts, embracing a press having a discharge-nozzle provided with adjustable internal projections for varying the pressure, a die, and an automatic cutting mechanism for severing the carbon rod into proper lengths as it leaves the die.

The invention will be first described, and then defined by the claims at the end of this specification.

In the annexed drawings, illustrating the invention, Figure 1 is a vertical longitudinal section on the line x x, Fig. 2, of one end of a horizontally-acting hydraulic press provided with an improved discharge-nozzle, die, and cutting mechanism for shaping and severing electric-light carbons. Fig. 2 is an end view of the discharge-nozzle and cutting mechanism, the cutter disks or wheels being shown in section. Fig. 3 is an enlarged side view of the lower cutter-carrying wheel and gearing. Fig. 4 is an edge view of the same.

Heretofore in presses employed for shaping or molding carbons for electric lights or other purposes it has been customary to insert an interchangeable die directly into the discharge end of the press, and to introduce and remove said die through the plunger end of the press after the plunger or ram has been withdrawn from the chamber that receives the plastic carbonaceous composition. As this chamber is usually of small diameter, considerable difficulty is experienced in removing and replacing the die through the same, especially as some portion of the carbon composition is liable to remain in the chamber at all times. Furthermore, in presses of this description, as usually constructed, there is an abrupt shoulder at the junction of the carbon-chamber and die-support, which is apt to occasion an accumulation of carbon at that point, and thereby interfere with a uniform compression of the carbon rod, besides obstructing the removal of the die when required.

According to my invention the above-recited difficulties are obviated by attaching to the press 1 a discharge-nozzle, 2, having a tapering or conical interior, forming a passage to the die. This die 3 may be attached by a screw-threaded connection to the outer end of the discharge-nozzle 2 in any suitable manner.

As shown in Fig. 1, the die 3 is provided with a central longitudinal bore corresponding in form and diameter to the carbon rod or pencil to be formed. The external cylindrical surface of this die is screw-threaded at one end, to take into a correspondingly-threaded recess in the end of a centrally-bored die-supporting block, 4, that is screwed into a threaded recess in the end of the discharge-nozzle. The inner end of the block 4 is recessed to receive a ring, 5, on which is formed a cross-head, 6, that is perforated to support a pin, 7, which is passed centrally through the block 4 and die 3 when it is desired to form the carbon rods with a central longitudinal bore or opening. When the carbon rod is to be formed solid, this pin 7 can be withdrawn after detaching the block 4 from the end of the nozzle. It will be observed that the inner surfaces of the ring 5 and block 4 are tapered so as to avoid an abrupt junction with the interior of the nozzle 2 and die 3, and thereby effect a uniform density of the carbon composition before it is forced through the die. The walls of the nozzle 2 are of sufficient thickness and strength to withstand the pressure to which the carbon composition is subjected.

In order to afford a means of thoroughly mixing the carbon composition and preventing any tendency to its becoming laminated while being forced toward the die, the nozzle 2 may be perforated at suitable intervals for the passage screw-bolts 8, that can be adjusted so as to project more or less within the nozzle. The inward-projecting points of these screw-bolts are preferably made somewhat conoidal, and serve to break the carbon composition as it is forced along by the press-plunger. The nozzle 2 is preferably perforated in spiral lines, so that the inward-projecting points of the screw-bolts 8 will better obstruct the passage of the carbon composition, and thereby effect a more perfect mixture and uniform density of the composition.

It is obvious that instead of arranging the adjustable screw-bolts 8 in spiral lines they can be placed in any irregular manner adapted to produce the desired effect. By adjusting these screw-bolts more or less inward the degree of resistance encountered by the carbon composition can be varied at will.

To the outer end of the block 4 is attached a ring, 9, that is provided with arms 10, in which are formed bearings for the shafts or journals 12 of a pair of grooved cutting-wheels, 13. Each wheel 13 is grooved circumferentially, to correspond with the diameter of the carbon rod, which, as it issues from the die 3, rotates the wheels by frictional contact with their grooved peripheries.

To each wheel 13 is secured a knife or cutter, 14, for severing the carbon rod into suitable lengths.

In order to cause the wheels 13 to move together with equal speed, their shafts 12 are provided with intermeshing gears 15, so arranged that the opposite knives or cutters 14 will always come together for the purpose of properly severing the carbon rod after a suitable length has been forced through the die. It will be seen that the pin 7 projects through the die to a point between the cutter-wheels, and serves to prevent collapse of a tubular carbon rod under the action of the knives or cutters. If desired, the grooved peripheries of the wheels 13 may be provided with raised letters or characters to imprint any appropriate label or mark on the carbons. The lower cutter-wheel shaft is adjustably supported by screws 16, that enable the lower wheel to be accurately adjusted, so as to properly guide and support the carbon rod as it issues from the die. The upper wheel-shaft is supported in slotted bearings, as shown, and both shafts are connected by an elastic band or bands, 17, whereby the peripheries of the cutter-wheels are held in such proximity as to be acted on by the moving carbon rod.

What I claim as my invention is—

1. In a machine for making electric-light carbons the combination, with a press, of a discharge-nozzle provided with a series of adjustable internal projections, substantially as described.

2. In a machine for making electric-light carbons, the combination, with a press, of a tapering discharge-nozzle having a series of adjustable internal projections and a die supported at the outer end of said nozzle, substantially as described.

3. In a machine for making electric-light carbons, the combination of a press having a tapering discharge-nozzle, a die-supporting block detachably connected to the outer end of said nozzle, a detachable die supported in the outer end of said block, a cross-head supported in the inner end of said block, and a removable pin supported in the cross-head and passed centrally through the die and its support, substantially as described.

4. In a machine for making electric-light carbons, the combination of a press, a die, and a guiding and cutting mechanism consisting of a pair of adjustable circumferentially-grooved wheels provided with cutters, substantially as described.

In testimony whereof I affix my signature in presence of two witnesses.

ALFR. PFANNKUCHE.

Witnesses:
 JAMES L. NORRIS,
 JOS. L. COOMBS.